(12) United States Patent
Tamatani et al.

(10) Patent No.: US 7,362,409 B2
(45) Date of Patent: Apr. 22, 2008

(54) LIQUID CRYSTAL DISPLAY DEVICE AND METHOD FOR MANUFACTURING THE SAME

(75) Inventors: Akira Tamatani, Kumamoto (JP); Yasunori Niwano, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 1273 days.

(21) Appl. No.: 09/803,103

(22) Filed: Mar. 12, 2001

(65) Prior Publication Data

US 2001/0052959 A1 Dec. 20, 2001

(30) Foreign Application Priority Data

Apr. 4, 2000 (JP) ............................. 2000-102738

(51) Int. Cl.
*G02F 1/1341* (2006.01)
*G02F 1/1339* (2006.01)

(52) U.S. Cl. ..................... 349/189; 349/154; 349/190

(58) Field of Classification Search ................ 349/155, 349/156, 158, 153–154, 189–190
See application file for complete search history.

(56) References Cited

U.S. PATENT DOCUMENTS

| | | | |
|---|---|---|---|
| 5,893,625 A | 4/1999 | Tamatani et al. | |
| 5,959,712 A | 9/1999 | Morii et al. | |
| 5,978,061 A * | 11/1999 | Miyazaki et al. | 349/106 |
| 6,067,144 A * | 5/2000 | Murouchi | 349/154 |
| 6,118,509 A * | 9/2000 | Miyake | 349/153 |
| 6,181,406 B1 * | 1/2001 | Morimoto et al. | 349/155 |
| 6,275,280 B1 * | 8/2001 | Kajita et al. | 349/106 |
| 6,525,799 B1 * | 2/2003 | Fukuda | 349/157 |

FOREIGN PATENT DOCUMENTS

| | | | |
|---|---|---|---|
| JP | 59078320 | * | 5/1984 |
| JP | 63-109420 | | 5/1988 |
| JP | 1-114823 | | 5/1989 |
| JP | 10-104642 | | 4/1998 |
| JP | 10104642 | * | 4/1998 |
| JP | 10-142610 | | 5/1998 |
| JP | 2000-66163 | | 3/2000 |

* cited by examiner

*Primary Examiner*—Dung T. Nguyen
(74) *Attorney, Agent, or Firm*—Oblon, Spivak, McClelland, Maier & Neustadt, P.C.

(57) ABSTRACT

A liquid crystal display device comprising a sealing material provided on a periphery of a substrate, projections formed by etching a film formed on the subtrate, and another substrate opposite the substrate being remote therefrom by a gap and being supported by the projections. An area occupying rate of the projections portions with respect to a region enclosed by the sealing material is not less than 0.0001 and not more than 0.003. It is possible to obtain a liquid crystal display device free of display blurs at the time of using the same in a high temperature condition and with which no bubbles are generated when using the same in a low temperature condition by setting the area occupying ratio for the columnar spacers to be optimal value.

17 Claims, 11 Drawing Sheets

LIQUID CRYSTAL DISPLAY DEVICE AND METHOD FOR MANUFACTURING THE SAME

BACKGROUND OF THE INVENTION

The present invention relates to a liquid crystal display device and a method for manufacturing the same wherein the device employs columnar spacers (projections) for maintaining a gap into which liquid crystal is injected constant.

Figure 9:
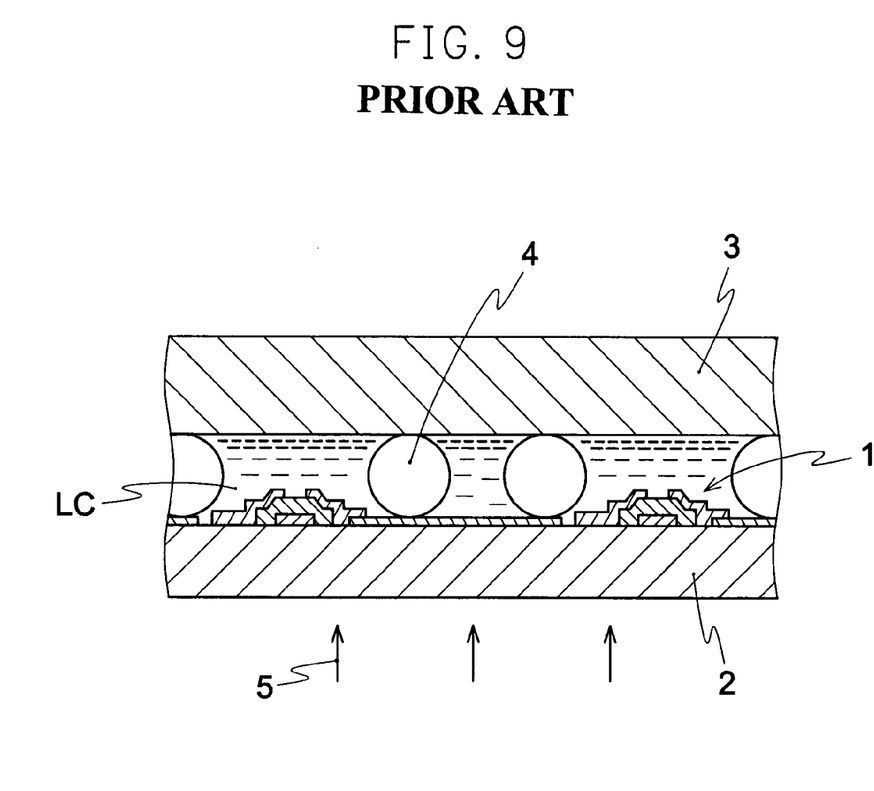
FIG. 9 is a plan view for explaining a conventional arrangement of bead-like spacers.

A liquid crystal display device is arranged to create images by varying an amount of light 5 from a backlight light source by controlling conditions of orientation of liquid crystal molecules through a thin film transistor (TFT) 1 as illustrated in FIG. 9. In case liquid crystal LC is employed as optical shutters, accuracies of thicknesses of liquid crystal layers (gaps) account for influences on display characteristics such as light transmission rate, contrast ratio or response speed, so that it is crucial to maintain the thickness constant. It is generally the case that this is achieved through bead-like minute particles called spacers 4. The spacers 4 are composed of spherical silica or divinyl benzene polymer.

Spacer dispersing processes and liquid crystal injecting processes performed thereafter will now be explained.

An orientation film is formed on a TFT substrate 2 which is build-in with a TFT 1 or electrode wiring, and this substrate undergoes rubbing treatments (a surface of the orientation film is rubbed with a cloth). Thereafter, spacers 4 are dispersed onto the TFT substrate 2, and the substrate 2 is stack joined with a color filter substrate 3 to be remote therefrom by a specified gap. It should be noted that, for instance, a dry dispersing method is actually used for dispersing a specified amount of bead-like spacers 4 over the entire substrate in an uniform manner.

It should further be noted that peripheries of both substrates are sealed by using a sealing material except of an injection inlet through which liquid crystal is injected. This substrate is put into a vacuum chamber. When a pressure within the both substrates becomes not more than a specified pressure in the vacuum chamber through decompressing actions, the liquid crystal injection inlet is immersed into a liquid crystal bath, and the vacuum chamber is returned to atmospheric pressure. Owing to a pressure difference between the atmospheric pressure and the internal pressure of the both substrates (decompressed state), liquid crystal is filled into the gap.

However, many technical drawbacks such as degradations in uniformity of the gap owing to aggregation of spacers, increases in tact caused in spacer dispersing processes, and leakage of light owing to blurs in orientation in proximities of spacers were pointed out in view of such spacer dispersing methods.

Especially in liquid crystal display devices of birefringence mode which are represented by those employing a transverse field method, specifications for setting gaps are quite strict (designed value ±0.1 μm), and blurs in spacer dispersion (agglomerated blurs etc.) remarkably degrade display qualities when using the transverse field method. Even if it is possible to disperse the spacers in an uniform manner, the presence of variations in spacer diameters (average value ±0.2 μm) make it difficult to neglect variations in the spacers themselves.

In order to solve the above problem, it has been proposed for a columnar spacer method in which a film formed on a glass substrate (such as a color filter layer) is remained through etching to build-in projections onto the glass substrate. Since it is possible to perform selective disposition, no blurs in dispersing columnar spacers will be generated and it is further possible to exhibit uniformity of spacer heights for defining the gap since precise film forming processes are employed. Influences of blurs in orientation might be also be eliminated owing to the fact that columnar spacers can be selectively formed in a light-shielding region. It is disclosed, for instance, in Japanese Unexamined Patent Publication No. 186379/1998 to manufacture separate projections by using a light-shielding film, and Japanese Unexamined Patent Publication No. 268356/1998 discloses that separate projections are manufactured by using a color filter film. Optimization of shapes of columnar spacers or methods for disposing the same are further introduced in Japanese Unexamined Patent Publication No. 73088/1997 or Japanese Unexamined Patent Publication No. 48636/1998 for the purpose of decreasing mechanical damages on the columnar spacers caused through a cloth for rubbing the orientation film or of improving blurs in rubbing in proximities of spacers.

However, in putting the above techniques related to columnar spacers into practical use, there was presented a new technical drawback that ambient temperatures need to be considered. These drawbacks will now be explained with reference to the drawings.

Figure 10A:
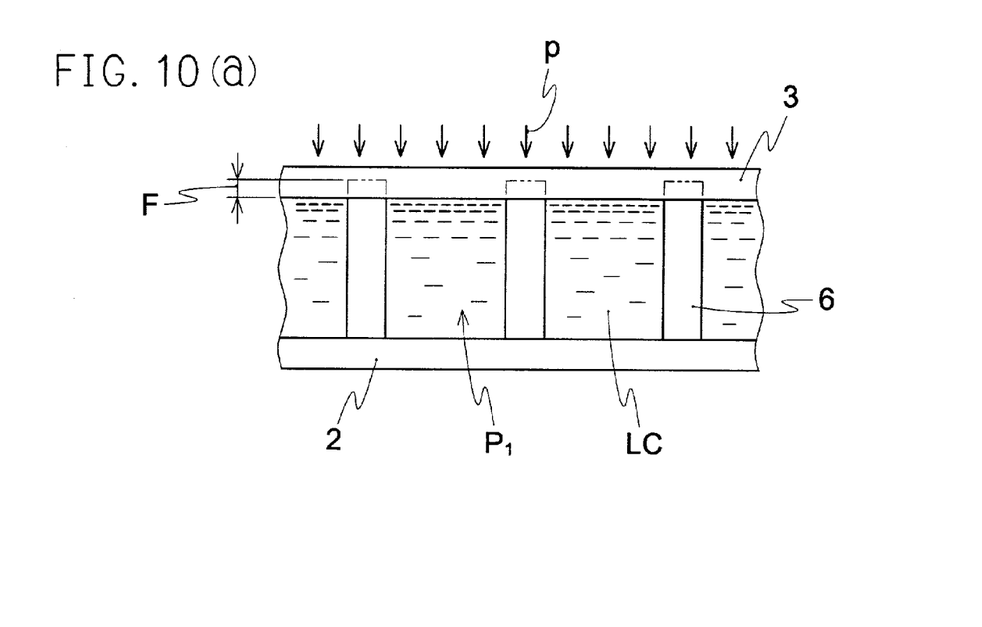
FIG. 10 is a view for explaining problems accompanying the thermal expansion of liquid crystal.
Figure 10B:
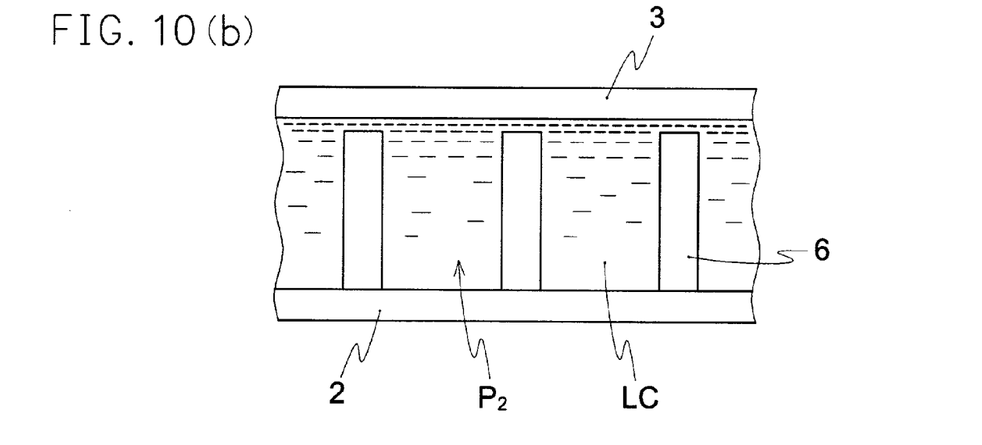

(1) Display blurs owing to thermal expansion of liquid crystal (see FIG. 10).

After performing vacuum injection, the liquid crystal LC is maintained in a negative pressure condition (wherein P1 is not more than atmospheric pressure), and the columnar spacers 6 receive compressive pressure p from substrates 2, 3 corresponding to a difference in internal pressure $P_1$ of the liquid crystal and atmospheric pressure as illustrated in FIG. 10 whereupon the columnar spacers 6 are elastically deformed (elastic compression amount F). However, since the liquid crystal LC is heated through radiant heat from a light source or a driving circuit, the liquid crystal LC thermally expands so that its internal pressure $P_1$ is increased. Consequently, when the internal pressure $P_1$ of liquid crystal LC exceeds the atmospheric pressure to become $P_2$, the columnar spacers 6 will peel off from the glass substrate 3 which had been supported thereby and a substrate supporting effect of the columnar spacers 6 will vanish. Effects of the spacers of applying uniform pressure to the substrate might not be exhibited and display blurs accompanying degradations in uniformity of the gap will be induced.

While values of thermal expansion are dependent on liquid crystal materials, the value of thermal expansion of liquid crystal having, for instance, a thermal expansion coefficient of $\alpha=7.46\times10^{-4}$/K is estimated to be approximately 0.075 μm in case of a temperature increase of 20° C. from room temperature (approximately 20° C.), provided that an initial gap satisfies g=5 μm.

Figure 11A:
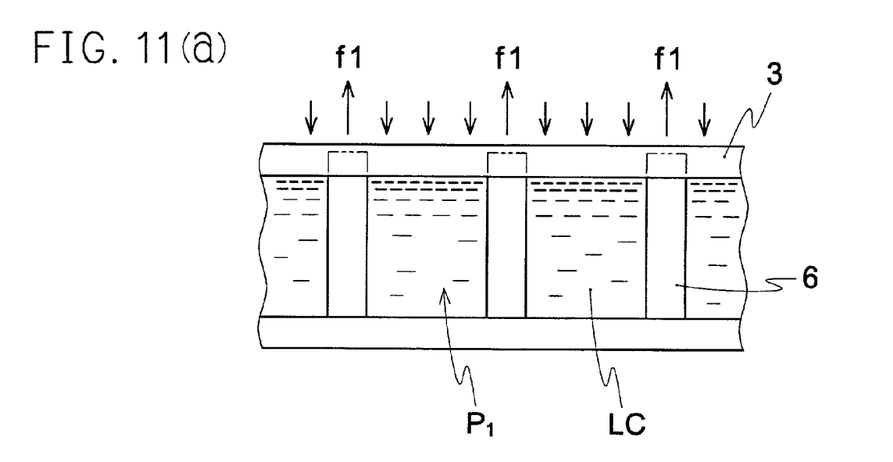
FIG. 11 is a view for explaining problems accompanying the heat shrinkage of liquid crystal.
Figure 11B:
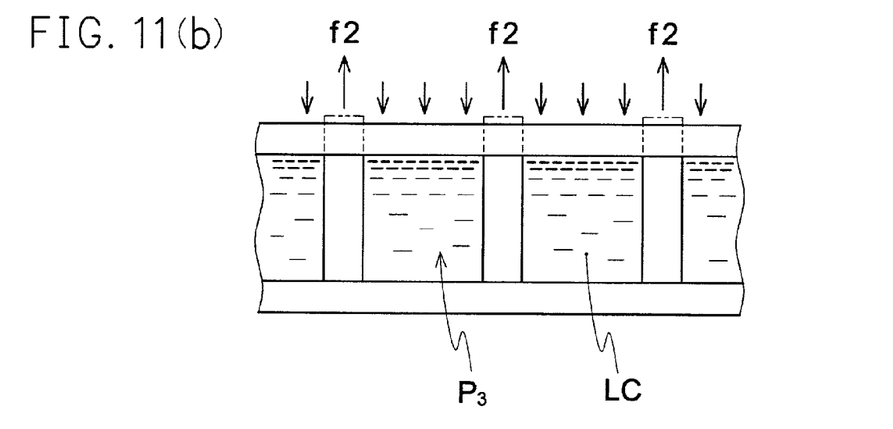

(2) Generation of bubbles owing to negative pressure of liquid crystal (see FIG. 11)

Owing to balancing conditions of force, the columnar spacers 6 will push the glass substrate 3 up at a reaction force f1 corresponding to a difference in internal pressure $P_1$ of the liquid crystal LC and atmospheric pressure (see FIG. 11(a)). In case heat shrinkage of the liquid crystal LC occurs accompanying a decrease in temperature of the liquid crystal LC, an elastic shrinkage amount of the columnar spacers 6 will increase following the shrinkage. This increase in elastic shrinkage amount will cause an increase in reaction force f2 of the columnar spacers 6 as well. Simultaneously therewith, the difference in pressure between atmospheric pressure and internal pressure $P_3$ of the liquid crystal LC will increase to maintain balance with the reaction force f2. The internal pressure of liquid crystal will accordingly decrease to promote conversion of the liquid crystal LC to a negative pressure condition and to generate bubbles owing to carburetion of liquid crystal.

It is thus an object of the present invention to solve the above-described problems, and to provide a liquid crystal display device and a method for manufacturing the same capable of preventing generation of display blurs owing to thermal expansion of liquid crystal and generation of bubbles owing to heat shrinkage.

SUMMARY OF THE INVENTION

In accordance with the present invention, there is provided a liquid crystal display device comprising a sealing material provided on a periphery of a substrate for preventing leakage of liquid crystal, projections formed by etching a film formed on the substrate, and another substrate opposing the substrate being remote therefrom by a gap and being supported by the projections, wherein an area occupying rate of the projections with respect to a region enclosed by the sealing material is not less than 0.0001 and not more than 0.003.

The area occupying rate is desirably not less than 0.001 and not more than 0.002, and more preferably not less than 0.001 and not more than 0.0015.

In accordance with the present invention, there is further provided a liquid crystal display device comprising a sealing material provided on a periphery of a substrate for preventing leakage of liquid crystal, projections formed by etching a film formed on the substrate, and another substrate opposing the substrate being remote therefrom by a gap and being supported by the projections, wherein heights of columnar spacers are varied.

It is preferable that heights are different by not less than 0.05 μm.

In accordance with the present invention, there is also provided a method for manufacturing a liquid crystal display device comprising the steps of forming projections by etching a film formed on a substrate, applying a sealing material on a periphery of the substrate in an annular form except for an injection inlet for liquid crystal, overlapping another substrate onto the substrate with the projections and the sealing material being interposed therebetween, injecting liquid crystal through the liquid crystal injection inlet into a region enclosed by the sealing material, and applying a pressure of not less than 1,000 Pa and not more than 40,000 Pa to the surfaces of both substrates.

It is preferable to apply a pressure of not less than 1,000 Pa and not more than 20,000 Pa onto the surfaces of the substrates. It is further preferable to apply a sealing agent to the liquid crystal injection inlet simultaneously with applying pressure to surfaces of both substrates.

In accordance with the present invention, there is yet further provided a method for manufacturing a liquid crystal display device comprising the steps of forming projections by etching a film formed on a substrate, applying a sealing material on a periphery of the substrate in an annular form except for an injection inlet for liquid crystal, overlapping another substrate onto the substrate with the projections and the sealing material being interposed therebetween, injecting liquid crystal through the liquid crystal injection inlet into a region enclosed by the sealing material, and applying a sealing agent to the injection inlet of the liquid crystal display device after elapse of a specified time from completion of injecting liquid crystal.

DETAILED DESCRIPTION

Embodiment 1

Arrangements of the liquid crystal display device and a thin film transistor will first be explained. A relationship between an area occupying rate of columnar spacers and ambient temperature will be explained thereafter.

(1) Basic arrangements of the Liquid Crystal Display Device

Figure 1:
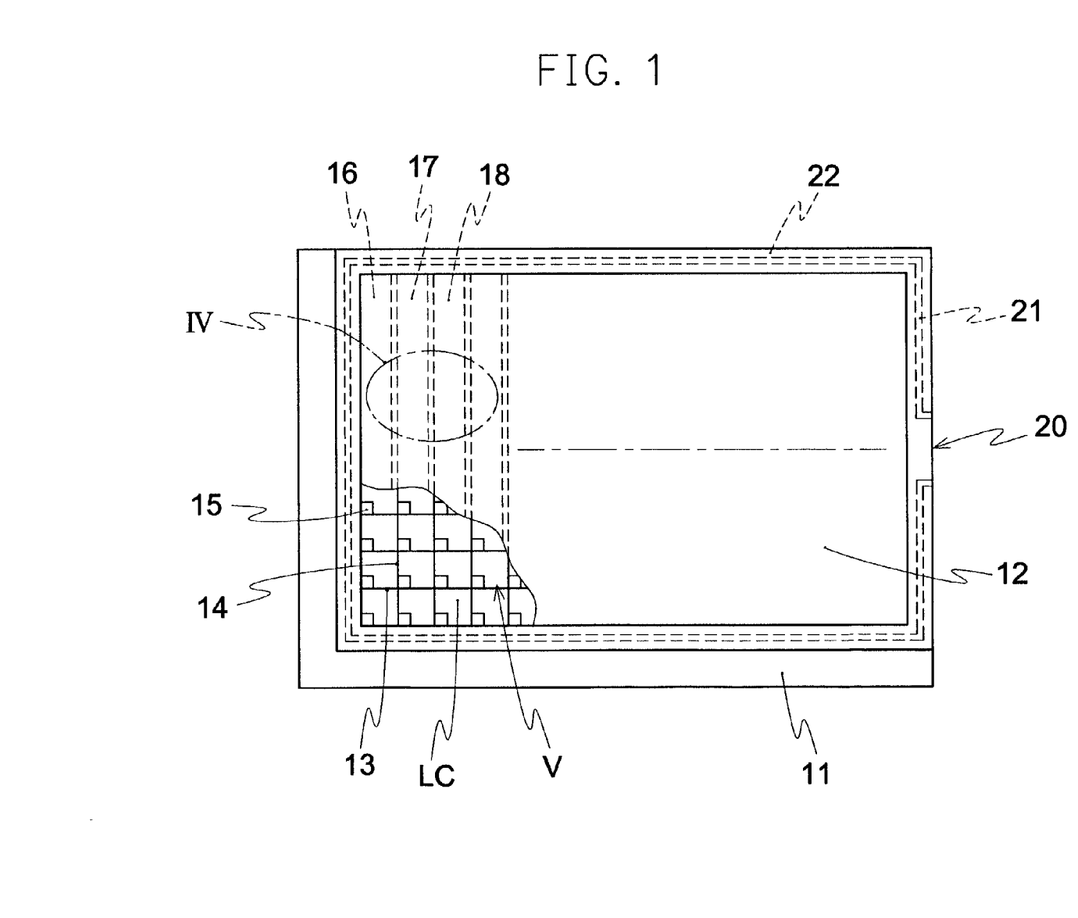
FIG. 1 is a partially cut-away plan view showing an arrangement of a liquid crystal display device.
Figure 2:
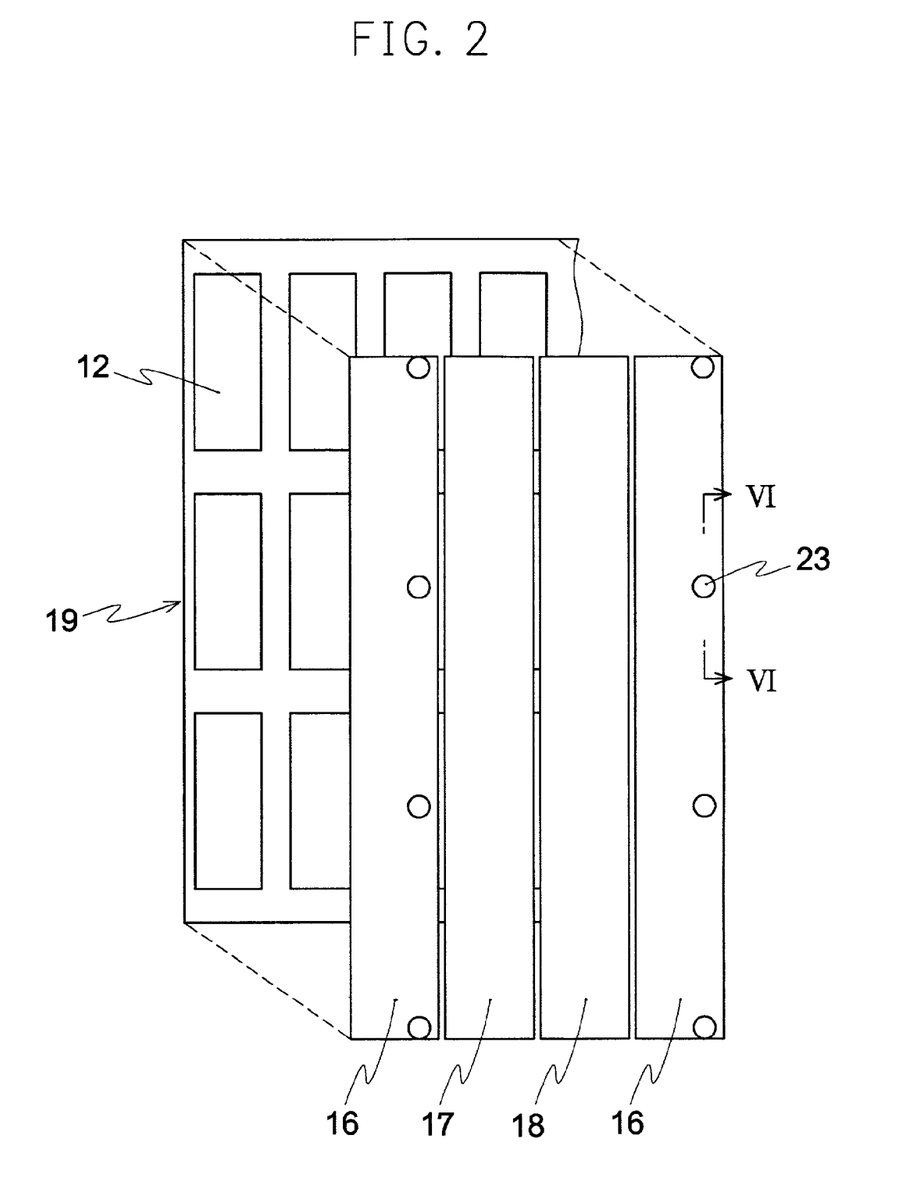
FIG. 2 is a view illustrating a color filter substrate formed with columnar spacers with a liquid crystal contacting surface facing up, and is an enlarged view of region IV of FIG. 1.

FIG. 1 is a view showing an arrangement of the liquid crystal display device. FIG. 2 is a view illustrating a condition in which a liquid crystal contacting surface of a color filter substrate formed with columnar spacers is facing up, which is an enlarged view of region IV of FIG. 1.

A TFT substrate 11 and a color filter substrate 12 are disposed in a mutually opposing manner with a specified gap (not shown) being formed therebetween, and liquid crystal (LC) is filled into this gap. The TFT substrate 11 is formed with scanning signal wiring 13 and image signal wiring 14 which are mutually intersecting. For controlling a pixel region V enclosed by the wiring 13, 14 through switching, TFTs 15 are provided in proximities of intersections of respective wirings. The color filter substrate 12 is formed with stripe-like red, green, and blue colored layers 16, 17, 18 and with a black matrix layer 19 for parting these layers. It should be noted that columnar spacers 23 are disposed on the blue colored layer 16.

Leakage of liquid crystal is prevented by means of a sealing material 21 formed in an annular manner on a periphery of the TFT substrate 1 (except for injection inlet 20). This region for filling the liquid crystal therein enclosed by the sealing material 21 is a region which is directly subjected to pressurizing actions owing to thermal expansion or heat shrinkage of liquid crystal. A peripheral light-shielding layer 22 is further formed in an annular manner to cover the sealing material 21 and to extend inward of the region for filling the liquid crystal therein. With this arrangement, a display region surrounded by the peripheral light-shielding layer 22 is formed. A mainly used material for the sealing material 21 is an epoxy-type resin. A material for forming the black matrix layer 19 might be a metal such as chrome, nickel, aluminum, or black resin. In case of employing a metallic black matrix layer, the thickness is set to be 0.05 to 0.5 µm. In case of employing a resin black matrix layer, the thickness is set to be 0.5 to 3 µm in order to secure light-shielding properties. Acrylic resin dispersed with pigments is used as a material for forming the colored layers. The thickness of the colored layer, which varies depending on color properties, is desirably set to 0.5 to 2.5 µm.

Figure 4:
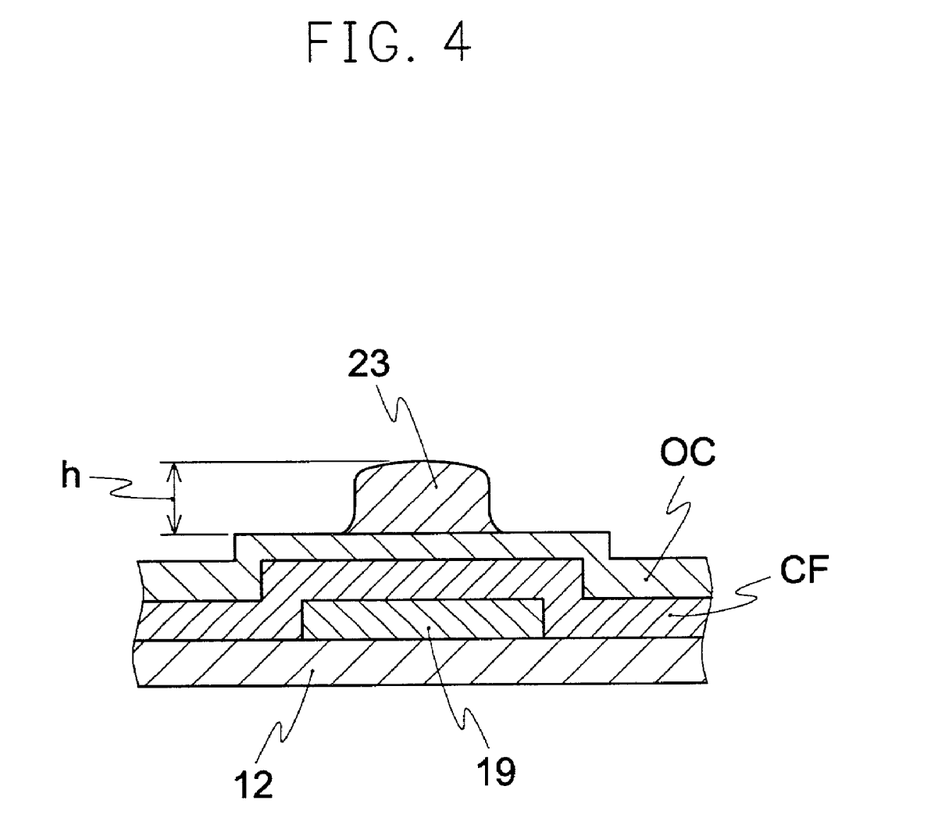
FIG. 4 is a sectional view taken along the line VI-VI in FIG. 2.

According to the enlarged view of the color filter substrate side and the sectional view taken along the line VI-VI in FIG. 4 (FIGS. 2 and 4), the black matrix layer 19 and the colored layer (CF) are laminated onto the color filter substrate 12. Columnar spacers 23 are provided onto these layers with an overcoat film (protective film) (OC) being interposed therebetween. A material used for the columnar spacers 23 is a photosensitive resin such as acrylic resin. The columnar spacers 23 are etched (pattern formed) through a photo-lithographic method after forming film of a specified thickness (corresponding to the gap). Even if blurs in orientation (deficiencies in orientation process of the orientation film) owing to the columnar spacers 23 shall be generated, problems of blurs in display such as leakage of light might be eliminated since the columnar spacers 23 and peripheries thereof are covered by the black matrix layer 19. It should be noted that a transparent organic insulating film such as an acrylic type resin is used to form the overcoat film (OC.). The thickness thereof is preferably set to 0.5 to 3.0 µm.

(2) Basic Arrangement of the TFT

Figure 3:
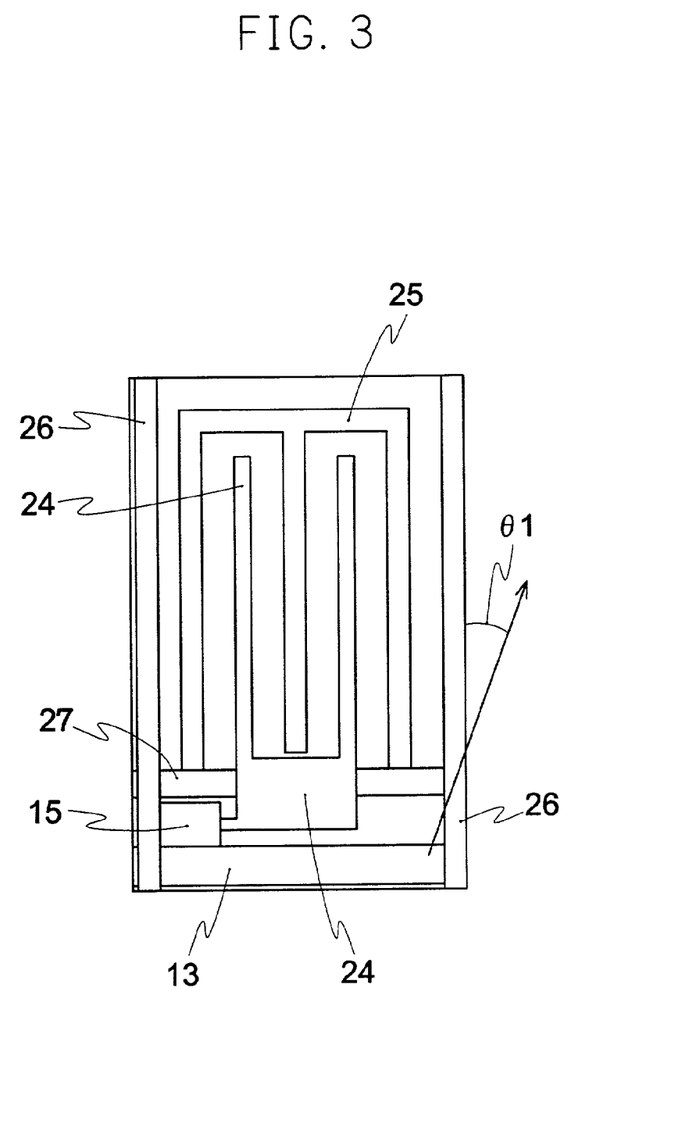
FIG. 3 is a structural view of a single pixel of a liquid crystal display device which is referred to as one of a transverse field method, and is an enlarged view of region V of FIG. 1.

FIG. 3 is a structural view of a single pixel of the liquid crystal display device which is referred to as one of a transverse field method, and is an enlarged view of region V of FIG. 1. A drain electrode 24 connected to a TFT 15 assumes a comb-like shape. A common electrode 25 formed on the same layer as the drain electrode 24 is also of comb-like shape. When the TFT 15 is in a conducted condition, signals propagated through the image signal wiring 26 are impressed on the drain electrode 24, and a parallel electric field is generated on the TFT substrate 11 owing to a difference in voltage between the drain electrode 24 and the common electrode 25. This electric field acts to change the orientation condition of the liquid crystal molecules and to control the brightness of a single pixel. It should be noted that the common electrode 25 is connected to common signal wiring 27. The common signal wiring 27 extend parallel to the scanning signal wiring 13 up to an end of the substrate, and the common signal wiring 27 are also electrically connected to common electrodes of respective pixels disposed in the direction of writing. The angle $\theta_1$ illustrated in the drawing indicates an angle for a rubbing direction of the orientation film formed on the TFT substrate 11 (angle with respect to the image signal wiring), wherein $\theta_1 = 15°$ is satisfied. It should be noted that the rubbing directional angle is generally set to 0° to 30° with respect to the image signal wiring 26 in case of liquid crystal exhibiting positive dielectric anisotropy, and the rubbing direction of the orientation film formed on the TFT substrate is set to be identical to the rubbing direction of the orientation film formed on the color filter substrate.

(3) Area Occupying Rate of Columnar Spacers

FIG. 4 is a sectional view taken along the line VI-VI of FIG. 2, and illustrates a sectional shape of the columnar spacers 23.

Since the columnar spacers 23 are formed through photo-lithographic method, they assume a section of trapezoid shape. Thus, a value obtained by dividing a volume of a columnar spacer 23 by its height h is used as a conversion area. An area occupying rate of the columnar spacers 23 is defined to be a numerical value obtained by dividing, by a substrate area value of a region for filling the liquid crystal therein which is enclosed by the sealing material, a sum of conversion area values of the entire columnar spacers included in this region.

In case one columnar spacer is disposed for each single pixel (wherein the spacers are of identical shape), it is also possible to employ a numerical value obtained by dividing a conversion area value of one columnar spacer by an area value of one pixel as a value for indicating the area occupying ratio.

In case the value of the area occupying ratio is too large, it is impossible to secure a sufficient amount of shrinkage deformation for the columnar spacers 23. Thus, in case of thermal expansion of liquid crystal owing to an increase in temperature of the liquid crystal display, the substrate supported by the columnar spacers 23 will separate from the columnar spacers 23. If the columnar spacers 23 cannot support the substrate, no uniform pressure can be applied onto the substrate to thereby cause display blurs. Moreover, in case the area occupying rate is too large, a reaction force applied to the substrate on the columnar spacers 23 side will increase owing to heat shrinkage of liquid crystal so as to promote decreases in internal pressure of liquid crystal and thus cause problems of generation of bubbles. It was found through experiments that an upper limit value of the area occupying ratio of the columnar spacers 23 shall be 0.003, preferably 0.002, and more preferably 0.0015 (see Examples 1, 2, 3, and 4).

On the other hand, in case the value for the area occupying rate is too small, the columnar spacers 23 will be damaged through compression by atmospheric pressure (98,000 Pa) applied to the liquid crystal display device at the time of injecting liquid crystal. A compressive failure strength of photosensitive resin such as acrylic type resin which is employed for forming the columnar spacers 23 is generally considered to be approximately $9.8 \times 10^7$ to $9.8 \times 10^8$ Pa. Since a value obtained by dividing the atmospheric pressure (98,000 Pa) by the compressive failure strength is 0.001 to 0.0001, a lower limit value for the area occupying ratio of the columnar spacers 23 will be 0.0001. In consideration of designing variations of the columnar spacers 23 or conditions for using the liquid crystal display device (effects owing to external pressure, etc.), it is preferable to set the lower limit value to be approximately 0.0005.

Embodiment 2

The present embodiment is characterized in that problems owing to ambient temperatures of columnar spacers are improved by performing a pressurized sealing process in the liquid crystal display device. An outline of the pressurized sealing process and effects thereof will now be explained.

A thermosetting type sealing material (XN31A manufactured by Mitsui Toatsu Kagaku Kabushiki Kaisha) is applied by means of a dispenser device on a periphery of a TFT substrate or a color filter substrate in an annular manner except for a liquid crystal injection inlet for injecting liquid crystal (a portion forming the injection inlet when the substrates are overlapped). Thereafter, the TFT substrate and the color filter substrate are overlapped and heated to approximately 200° C. whereupon thermosetting thereof is performed for 1 hour in a condition of 60,000 Pa. It should be noted that MACROROD PF-41 (manufactured by Nippon Electric Glass Co., Ltd.) is mixed to the sealing material at a ratio of approximately 2 wt %.

Thereafter, the substrates are put into a vacuum chamber. When a pressure within the both substrates becomes not more than a specified pressure in the vacuum chamber through decompressing actions, the liquid crystal injection inlet is immersed into liquid crystal, and the vacuum chamber is returned to atmospheric pressure. Owing to a pressure difference between the atmospheric pressure and the internal pressure of the both substrates (negative pressure), liquid crystal is filled into the gap. At this time, a pressure substantially corresponding to atmospheric pressure is applied to the columnar spacers so that the columnar spacers are compressed and deformed. Upon completion of injection of liquid crystal, liquid crystal is wiped from the liquid crystal injection inlet. Owing to surface tension of liquid crystal, the internal pressure thereof is maintained at a negative pressure for a specified time and gradually approaches atmospheric pressure.

Upon elapse of a specified time after completion of injecting liquid crystal, the liquid crystal display device undergoes a pressurizing process simultaneously with sealing the liquid crystal injection inlet with a sealing agent (which is called a pressurized sealing process). Besides contributing to prevention of mixing of bubbles and improvements in uniformity of the gap, this pressurized sealing process exhibits the following important effects.

Figure 5:
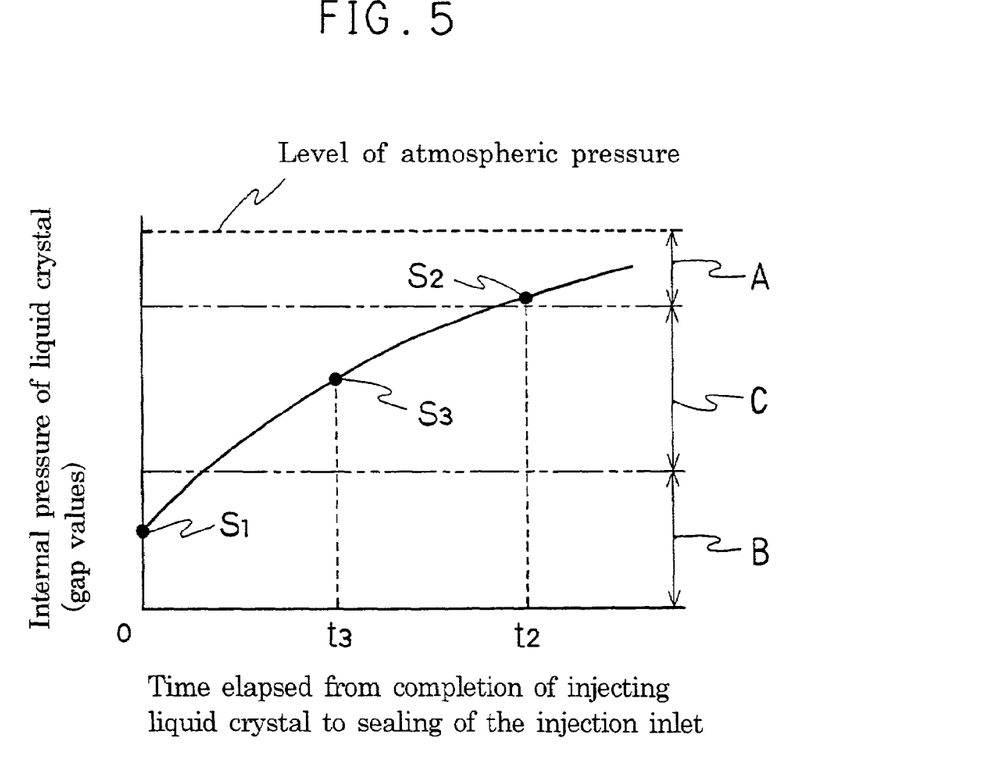
FIG. 5 is a view for explaining a relationship between a time elapsed from completion of injecting liquid crystal to sealing of the injection inlet and internal pressure of liquid crystal.

FIG. 5 illustrates a relationship between time elapsed from completion of injecting liquid crystal to sealing of the injection inlet and internal pressure of liquid crystal. In FIG. 5, the transverse axis indicates elapsed time after completion of injection and the longitudinal axis internal pressure of liquid crystal while further corresponding to gap values between the substrates. As illustrated in FIG. 5, the internal pressure of liquid crystal approaches atmospheric pressure with time elapsing from the point of completion of injecting liquid crystal (point $S_1$), and an elastic compression amount of the columnar spacers decreases simultaneously therewith (that is, the gap value becomes larger). It should be noted that the gap becomes a completely closed space upon sealing of the injection inlet so that the internal pressure of liquid crystal will not be changed thereafter. In FIG. 5, there are respectively illustrated a display blur occurring region A, a bubble occurring region B, and a stable display region C sandwiched between these regions.

The display blur occurring region A indicates a region in which deficiencies of display blurs are induced at a liquid crystal temperature of not less than 50° C., and the bubble occurring region B a region in which deficiencies of bubbles are induced at a liquid crystal temperature of not more than −20° C.

It is assumed that the internal pressure of liquid crystal changes to moving point $S_2$ in case time $t_2$ has elapsed from completion of injection. Since the moving point $S_2$ is located within the display blur occurring region A, there might happen that display blurs are caused upon performing a high temperature test if sealing of the liquid crystal injection inlet is performed in this pressure condition. For avoiding such a case, the entire surface of the liquid crystal panel substrate is pressurized at a specified pressure simultaneously with sealing the injection inlet (with this arrangement, the columnar spacers are recompressed). By performing this pressurized sealing, the internal pressure of liquid crystal can be moved to moving point $S_3$ (stable display region). In other words, by performing the pressurized sealing process, it is possible to control the internal pressure of liquid crystal and to improve occurrence of deficiencies in case of high temperature and low temperature conditions of liquid crystal.

Thus, by changing the internal pressure of liquid crystal and compressing the columnar spacers through pressurized sealing, it is possible to make the substrate and columnar spacers hardly peel off from each other even upon thermal expansion of liquid crystal when the temperature of liquid crystal increases. However, since the pressurized sealing also acts to promote occurrence of bubbles (increase in reaction force of columnar spacers), the upper limit value for the pressurizing force is desirably 40,000 Pa and preferably 20,000 Pa (see Examples 5, 6, and 7). The lower limit value for the pressurizing force shall desirably be 1,000 Pa in order to secure a constant pressurizing effect. It should be noted that a pressurizing time is required to be at least approximately 5 minutes.

It should be noted that the internal pressure of liquid crystal is considered to move from point of completion $S_1$ to proximate to moving point $S_3$ upon elapse of a specified time $t_3$ from the point of completion of injecting liquid crystal. Thus, in case the sealing agent is applied at a point at which time $t_3$ has elapsed after completion of injection, the above-described pressurizing process might be omitted (see Examples 8, 9, 10 and 11).

Embodiment 3

Figure 6A:
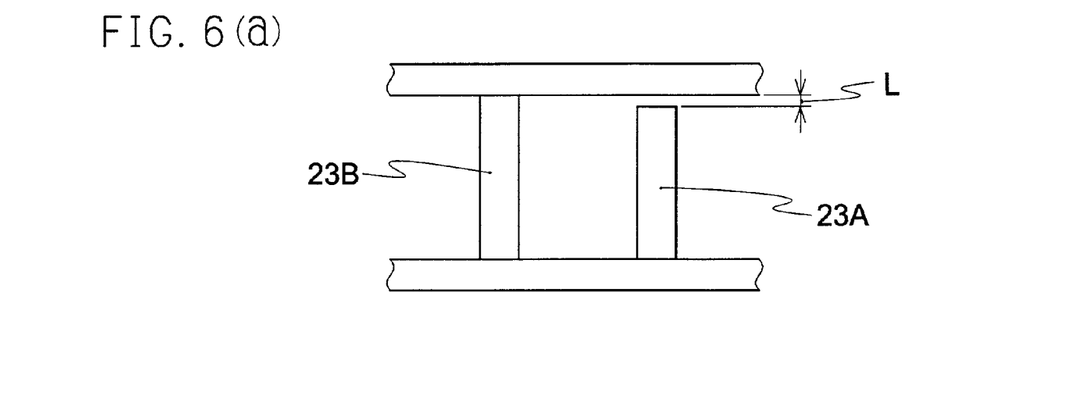
FIG. 6 is a view for explaining operations for varying heights of the columnar spacers.
Figure 6B:
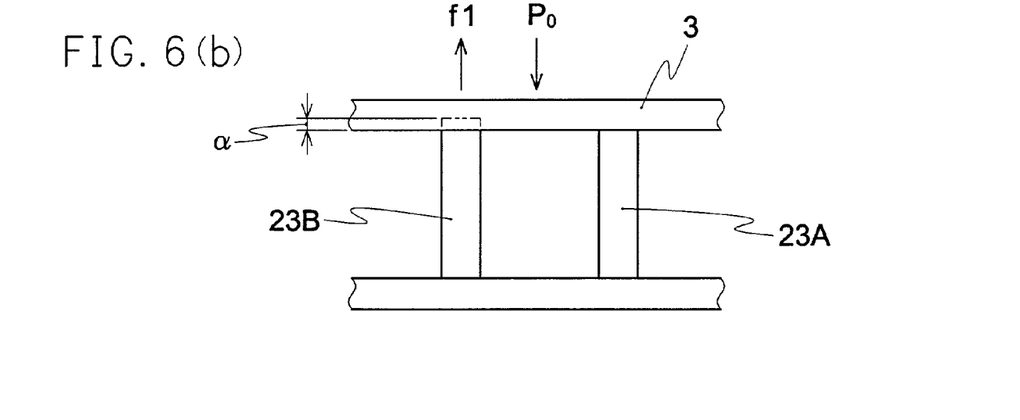
Figure 6C:
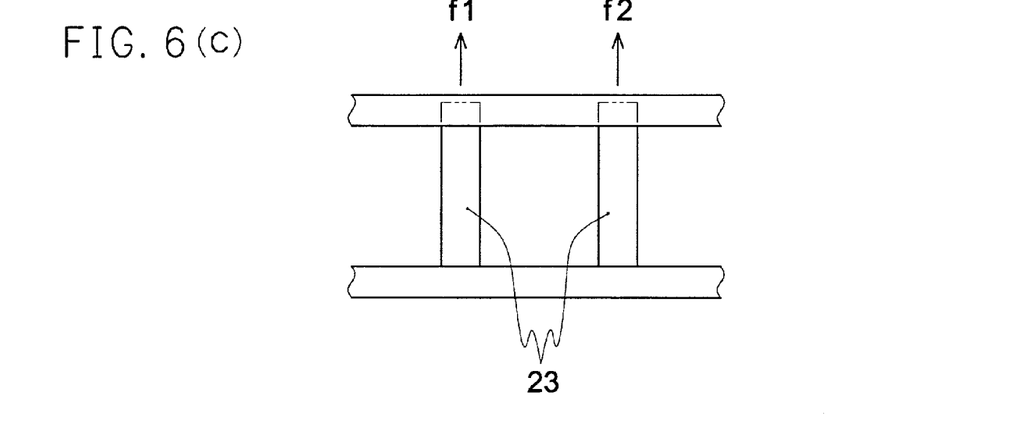

The present embodiment is characterized in that two types of spacers of different height are disposed. As illustrated in FIG. 6(a), a difference in height L is set for a first group of columnar spacers 23A and a second group of columnar spacers 23B. When the glass substrate 3 is subjected to a compressing pressure $P_0$ and an amount of compression a of the columnar spacers 23B is not more than L, only reaction force f1 of the second group of columnar spacers 23B acts on the substrate (FIG. 6(b)). Thus, the reaction force f1 of the columnar spacers 23B will be smaller than a reaction force caused when employing columnar spacers 23 of identical height (a sum of f1 and f2) (see FIG. 6(c)). Consequently, the amount of compressive deformation of the columnar spacers might be larger in case of varying heights of the columnar spacers compared to a case in which the heights are identical under conditions that area occupying ratio of columnar spacers and compressive force of columnar spacers are identical with each other. In other words, by varying heights for the columnar spacers, it is possible to increase the amount of compression of columnar spacers. It has been found through experiments that it is desirable to set the difference in height, in case two types of columnar spacers are formed at an identical ratio, to be not less than 0.05 μm (see Examples 12 and 13).

EXAMPLES

Parameters and test results (evaluation through visual inspection) related to Embodiment 1 will be described in summary in Examples 1 to 4, parameters and test results related to Embodiment 2 in Examples 5 to 11, and parameters and test results related to Embodiment 3 in Examples 12 and 13.

Figure 7:
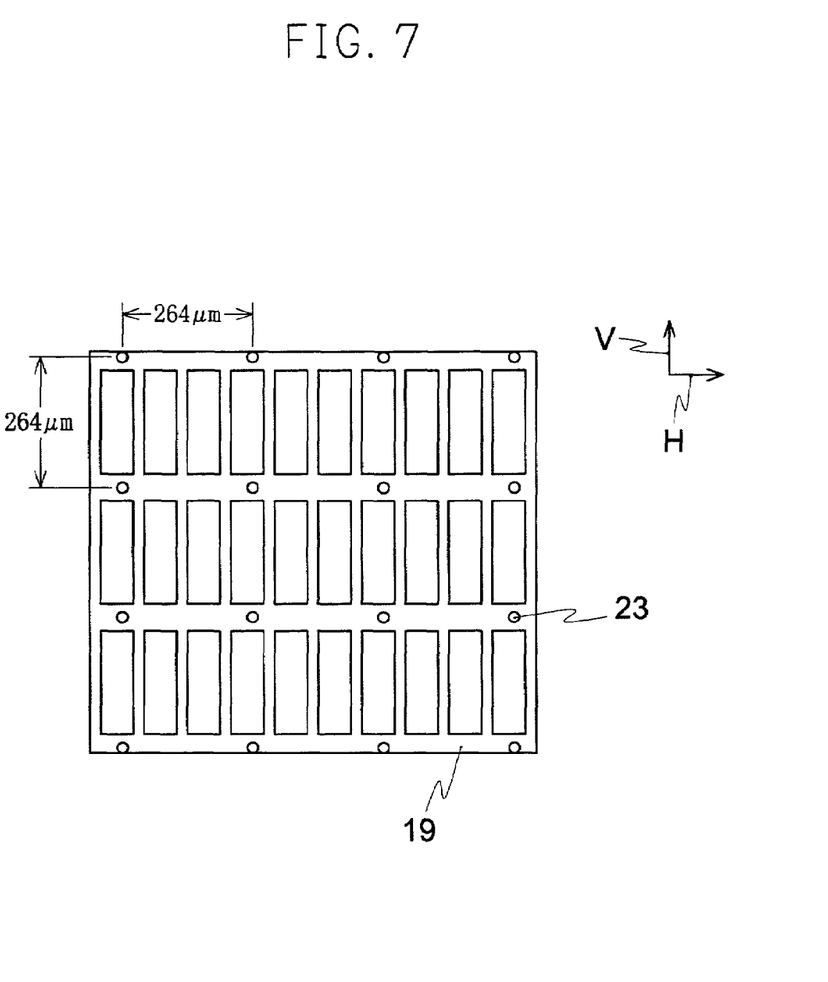
FIG. 7 is a view for explaining disposition of columnar spacers according to Example 1.

Example 1 (see FIG. 7)

The conversion area value of columnar spacers 23 was $1.1 \times 10^{-4}$ mm$^2$. 0

A pitch for disposing the columnar spacers 23 was 264 μm (horizontal direction H)×264 μm (vertical direction V).

It should be noted that the horizontal direction H denotes a direction of the scanning signal wiring and the vertical direction V a direction of the image signal wiring.

The area occupying ratio was 0.0016.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that superior characteristics were exhibited upon performing a high temperature test (performance test at 50° C.) and a low temperature test (performance test at −20° C.) and neither display blurs nor bubbles were observed.

Example 2

The conversion area value of columnar spacers was $1.1 \times 10^{-4}$ mm$^2$.

The pitch for disposing the columnar spacers was 176 μm (horizontal direction)×264 μm (vertical direction).

The area occupying ratio was 0.0024.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that hardly any display blurs were observed during the high temperature test.

Example 3

The conversion area value of columnar spacers was $1.1 \times 10^{-4}$ mm$^2$.

The pitch for disposing the columnar spacers was 88 μm (horizontal direction)×264 μm (vertical direction).

The area occupying ratio was 0.0048.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that some display blurs were observed during the high temperature test.

Example 4

The conversion area value of columnar spacers was $1.1 \times 10^{-4}$ mm$^2$.

The pitch for disposing the columnar spacers was 80 μm (horizontal direction)×264 μm (vertical direction).

The area occupying ratio was 0.0059.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that remarkable display blurs were observed during the high temperature test, and that bubbles were further generated in the low temperature test.

Example 5

The conversion area value of columnar spacers was $1.1 \times 10^{-4}$ m$^2$.

The pitch for disposing the columnar spacers was 240 μm (horizontal direction)×240 μm (vertical direction).

The area occupying ratio was 0.0019.

As for the pressurizing condition at the time of applying the sealing agent, no pressurized sealing process was performed.

A time elapsed from completion of injecting liquid crystal up to sealing the injection inlet was 120 minutes.

It was consequently found upon evaluation through visual inspection of the panel that display blurs were observed during the high temperature test.

Example 6

The conversion area value of columnar spacers was $1.1 \times 10^{-4}$ mm$^2$.

The pitch for disposing the columnar spacers was 240 μm (horizontal direction)×240 μm (vertical direction).

The area occupying ratio was 0.0019.

The pressurizing condition at the time of applying the sealing agent was 20,000 Pa.

A time elapsed from completion of injecting liquid crystal up to sealing the injection inlet was 120 minutes.

It was consequently found upon evaluation through visual inspection of the panel that neither blurs nor bubbles were observed.

Example 7

The conversion area value of columnar spacers was $1.1 \times 10^{-4}$ mm$^2$.

The pitch for disposing the columnar spacers was 240 μm (horizontal direction)×240 μm (vertical direction).

The area occupying ratio was 0.0019.

The pressurizing condition at the time of applying the sealing agent was 49,000 Pa.

A time elapsed from completion of injecting liquid crystal up to sealing the injection inlet was 120 minutes.

It was consequently found upon evaluation through visual inspection of the panel that bubbles were observed during the low temperature test.

Example 8

The conversion area value of columnar spacers was $0.8 \times 10^{-4}$ mm$^2$.

The pitch for disposing the columnar spacers was 240 μm (horizontal direction)×240 μm (vertical direction).

The area occupying ratio was 0.0014.

A time elapsed from completion of injecting liquid crystal up to sealing the injection inlet was 0 minutes.

As for the pressurizing condition at the time of applying the sealing agent, no pressurized sealing process was performed.

It was consequently found upon evaluation through visual inspection of the panel that bubbles were generated during the low temperature test.

Example 9

The conversion area value of columnar spacers was $0.8 \times 10^{-4}$ mm$^2$.

The pitch for disposing the columnar spacers was 240 μm (horizontal direction)×240 μm (vertical direction).

The area occupying ratio was 0.0014.

A time elapsed from completion of injecting liquid crystal up to sealing the injection inlet was 30 minutes.

As for the pressurizing condition at the time of applying the sealing agent, no pressurized sealing process was performed.

It was consequently found upon evaluation through visual inspection of the panel that neither display blurs nor bubbles were observed.

Example 10

The conversion area value of columnar spacers was $0.8 \times_{10}^{-4}$ mm$^2$.

The pitch for disposing the columnar spacers was 240 μm (horizontal direction)×240 μm (vertical direction).

The area occupying ratio was 0.0014.

A time elapsed from completion of injecting liquid crystal up to sealing the injection inlet was 60 minutes.

As for the pressurizing condition at the time of applying the sealing agent, no pressurized sealing process was performed.

It was consequently found upon evaluation through visual inspection of the panel that neither display blurs nor bubbles were observed.

Example 11

The conversion area value of columnar spacers was $0.8 \times 10^{-4}$ mm$^2$.

The pitch for disposing the columnar spacers was 240 μm (horizontal direction)×240 μm (vertical direction).

The area occupying ratio was 0.0014.

A time elapsed from completion of injecting liquid crystal up to sealing the injection inlet was 120 minutes.

As for the pressurizing condition at the time of applying the sealing agent, no pressurized sealing process was performed.

It was consequently found upon evaluation through visual inspection of the panel that display blurs were observed during the high temperature test.

Figure 8:
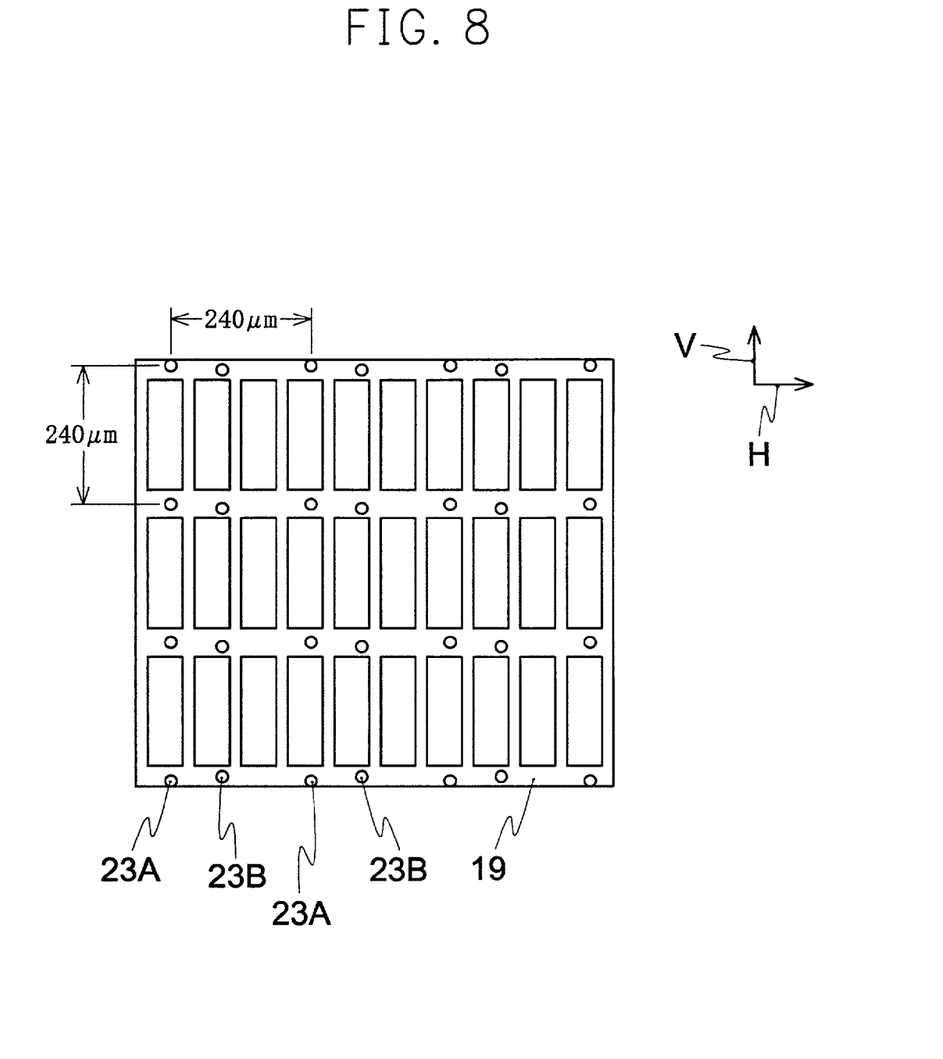
FIG. 8 is a view for explaining disposition of columnar spacers according to Example 12.

Example 12 (see FIG. 8)

The conversion area value of columnar spacers 23A was $2.0 \times 10^{-4}$ mm$^2$.

The pitch for disposing the columnar spacers 23A was 240 μm (horizontal direction H)×240 μm (vertical direction V).

The height of columnar spacers 23A was 3.4 μm.

The conversion area value of columnar spacers 23B was $0.5 \times 10^{-4}$ mm$^2$.

The pitch for disposing the columnar spacers 23B was 240 μm (horizontal direction)×240 μm (vertical direction).

The height of columnar spacers 23B was 3.6 μm.

The area occupying ratio was 0.0029.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that neither display blurs nor bubbles were observed.

It should be noted that both of the two types of columnar spacers 23A, 23B might be disposed on an overlapping portion of the black matrix and the colored layer on the color filter substrate (e.g. disposing columnar spacers of different types on the blue colored layer and on the red colored layer, respectively) or, alternatively, to dispose the first group of columnar spacers 23A on the overlapping portion of the black matrix and the colored layer on the color filter substrate while the second group of columnar spacers 23B are disposed on a region on the TFT substrate side opposing the overlapping portion.

Example 13

The conversion area value of columnar spacers A was $2.0 \times 10^{-4}$ mm$^2$.

The pitch for disposing the columnar spacers A was 240 μm (horizontal direction)×240 μm (vertical direction).

The height of columnar spacers A was 3.4 μm.

The conversion area value of columnar spacers B was $0.5 \times 10^{-4}$ mm.

The pitch for disposing the columnar spacers B was 240 μm (horizontal direction)×240 μm (vertical direction).

The height of columnar spacers B was 3.4 μm.

The area occupying ratio was 0.0029.

As for the pressurizing condition at the time of applying the sealing agent, no pressurized sealing process was performed.

A time elapsed from completion of injecting liquid crystal up to sealing the injection inlet was 60 minutes.

It was consequently found upon evaluation through visual inspection of the panel that slight display blurs were observed during the high temperature test.

As explained so far, according to the first aspect of the present invention, it is possible to obtain a liquid crystal display device free of display blurs at the time of using the same in a high temperature condition and with which no bubbles are generated when using the same in a low temperature condition by setting the area occupying ratio for the columnar spacers to be an optimal value.

According to the second aspect of the present invention, it is possible to further secure an amount of compressive deformation for the columnar spacers since heights of columnar spacers are varied, and thereby to obtain a liquid crystal display device free of display blurs at the time of using the same in a high temperature condition and with which no bubbles are generated when using the same in a low temperature condition.

According to the third aspect of the present invention, it is possible to obtain a liquid crystal display device in which display blurs at the time of using the same in a high temperature condition might be restricted by performing a pressurized sealing process.

According to the fourth aspect of the present invention, it is possible to obtain a liquid crystal display device free of display blurs at the time of using the same in a high temperature condition and with which no bubbles are generated when using the same in a low temperature condition by the arrangement of sealing the injection inlet of the liquid crystal display device by means of a sealing agent after a specified time has elapsed after completion of injecting liquid crystal.

What is claimed is:

1. A liquid crystal display device comprising: a sealing material provided on a periphery of a substrate for preventing leakage of liquid crystal, projections formed by etching a film formed on the substrate, and another substrate opposing the substrate being remote therefrom by a gap and being supported by the projections, wherein an area occupying ratio of the projections with respect to a region enclosed by the sealing material is not less than 0.001 and not more than 0.003.

2. The liquid crystal display device of claim 1, wherein the area occupying ratio is not less than 0.001 and not more than 0.002.

3. The liquid crystal display device of claim 1, wherein the area occupying ratio is not less than 0.001 and not more than 0.0015.

4. The liquid crystal display device of any one of claims 1-3, wherein the film is formed of acrylic resin.

5. A method for manufacturing liquid crystal display device comprising: forming projections by etching a film formed on a substrate; applying a sealing material on a periphery of the substrate in an annular form except for an injection inlet for liquid crystal; overlapping another substrate onto the substrate with the projections and the sealing material being interposed therebetween; injecting liquid crystal though the liquid crystal injection inlet into a region enclosed by the sealing material; and applying a pressure of not less than 20,000 Pa and not more than 40,000 Pa to surfaces of both substrates.

6. The method of claim 5, wherein a sealing agent is applied to the liquid crystal injection inlet simultaneously with applying pressure to the surfaces of both substrates.

7. A method for manufacturing a liquid crystal display device comprising: forming projections by etching a film formed on a substrate; applying a sealing material on a periphery of the substrate in an annular form except for an injection inlet for liquid crystal; overlapping another substrate onto the substrate with the projections and the sealing material being interposed therebetween; injecting liquid crystal through the liquid crystal injection inlet into a region enclosed by the sealing material; and applying a sealing agent to the injection inlet of the liquid crystal display device after elapse of a specified time from completion of injecting liquid crystal.

8. The method of claim 7, wherein the specified time is not less than 30 minutes and not more than 60 minutes.

9. A method for manufacturing liquid crystal display device comprising: forming projections by etching a film formed on a substrate; applying a sealing material on a periphery of the substrate in an annular form except for an injection inlet for liquid crystal, an area occupying ratio of the projections with respect to a region enclosed by the sealing material being designed to be not less than 0.001 and not more than 0.003; overlapping another substrate onto the substrate with the projections and the sealing material being interposed therebetween; injecting liquid crystal through the liquid crystal injection inlet into a region enclosed by the sealing material; and applying a pressure of not less than 20,000 Pa and not more than 40,000 Pa to surfaces of both substrates.

10. A method for manufacturing a liquid crystal display device comprising: forming projections by etching a film formed on a substrate; applying a sealing material on a periphery of the substrate in an annular form except for an injection inlet for liquid crystal, an area occupying ratio of the projections with respect to a region enclosed by the sealing material being designed to be not less than 0.001 and not more than 0.003; overlapping another substrate onto the substrate with the projections and the sealing material being interposed therebetween; injecting liquid crystal through the liquid crystal injection inlet into a region enclosed by the seal agent; and applying a sealing agent to the injection inlet of the liquid crystal display device after elapse of a specified time from completion of injecting liquid crystal.

11. A method for manufacturing liquid crystal display device of a transverse field method comprising: forming projections by etching a film formed on a substrate; applying a sealing material on a periphery of the substrate in an annular form except for an injection inlet for liquid crystal; overlapping another substrate onto the substrate with the projections and the sealing material being interposed therebetween; injecting liquid crystal through the liquid crystal injection inlet into a region enclosed by the sealing material; and applying a pressure of not less than 20,000 Pa and not more than 40,000 Pa to surfaces of both substrates, wherein a sealing agent is applied to the liquid crystal injection inlet simultaneously with applying pressure to surfaces of both substrates.

12. A method for manufacturing a liquid crystal display device of a transverse field method comprising: forming projections by etching a film formed on a substrate; applying a sealing material on a periphery of the substrate in an annular form except for an injection inlet for liquid crystal; overlapping another substrate onto the substrate with the projections and the sealing material being interposed therebetween; injecting liquid crystal through the liquid crystal injection inlet into a region enclosed by the sealing material; and applying a sealing agent to the injection inlet of the liquid crystal display device after elapse of a specified time from completion of injecting liquid crystal.

13. The method of claim 12, wherein the specified time is not less than 30 minutes and not more than 60 minutes.

14. A method for manufacturing liquid crystal display device of a transverse field method comprising: forming projections by etching a film formed on a substrate; applying a sealing material on a periphery of the substrate in an annular form except for an injection inlet for liquid crystal, an area occupying ratio of the projections with respect to a region enclosed by the sealing material being designed to be not less than 0.001 and not more than 0.003; overlapping another substrate onto the substrate with the projections and the sealing material being interposed therebetween; injecting liquid crystal through the liquid crystal injection inlet into a region enclosed by the sealing material; and applying a pressure of not less than 20,000 Pa and not more than 40,000 Pa to surfaces of both substrates.

15. A method for manufacturing a liquid crystal display device of a transverse field method comprising: forming projections by etching a film formed on a substrate; applying a sealing material on a periphery of the substrate in an annular form except for an injection inlet for liquid crystal, an area occupying ratio of the projections with respect to a region enclosed by the sealing material being designed to be not less than 0.001 and not more than 0.003; overlapping another substrate onto the substrate with the projections and the sealing material being interposed therebetween; injecting liquid crystal through the liquid crystal injection inlet into a region enclosed by the seal agent; and applying a sealing agent to the injection inlet of the liquid crystal display device after elapse of a specified time from completion of injecting liquid crystal, the specified time being not less than 30 minutes and not more than 60 minutes.

16. A method for manufacturing a liquid crystal display of a transverse field method device comprising: forming projections by etching a film formed on a substrate, heights of projections being varied by not less than 0.05 µm and not more than 0.2 µm; applying a sealing material on a periphery of the substrate in an annular form except for an injection inlet for liquid crystal, an area occupying ratio of the projections with respect to a region enclosed by the sealing material being designed to be not less than 0.0014 and not more than 0.0029; overlapping another substrate onto the substrate with the projections and the sealing material being interposed therebetween; injecting liquid crystal through the liquid crystal injection inlet into a region enclosed by the sealing material; and applying a sealing agent to the injection inlet of the liquid crystal display device after elapse of a specified time from completion of injecting liquid crystal, the specified time being not less than 30 minutes and not more than 60 minutes.

17. A method for manufacturing liquid crystal display device of a transverse field method comprising: forming projections by etching a film formed on a substrate, heights of projections being varied by not less than 0.05 µm and not more than 0.2 µm; applying a sealing material on a periphery of the substrate in an annular form except for an injection inlet for liquid crystal, an area occupying ratio of the projections with respect to a region enclosed by the sealing material being designed to be not less than 0.0014 and not more than 0.0029; overlapping another substrate onto the substrate with the projections and the sealing material being interposed therebetween; injecting liquid crystal through the liquid crystal injection inlet into a region enclosed by the sealing material; and applying a pressure of not less than 20,000 Pa and not more than 40,000 Pa to surfaces of both substrates.

\* \* \* \* \*